(12) United States Patent
Laatsch

(10) Patent No.: US 7,937,166 B2
(45) Date of Patent: May 3, 2011

(54) METHOD FOR ADJUSTING A SYSTEM THAT IS MODIFIED IN A CYCLE TO A NON-CONSTANT CYCLICAL TARGET PROFILE AND CONTROLLER THEREFOR

(75) Inventor: Erik Laatsch, Gottingen (DE)

(73) Assignee: Otto Bock Healthcare IP GmbH & Co. KG, Duderstadt (DE)

( * ) Notice: Subject to any disclaimer, the term of this patent is extended or adjusted under 35 U.S.C. 154(b) by 441 days.

(21) Appl. No.: 12/278,930

(22) PCT Filed: Jan. 25, 2007

(86) PCT No.: PCT/DE2007/000154
§ 371 (c)(1),
(2), (4) Date: Aug. 8, 2008

(87) PCT Pub. No.: WO2007/090366
PCT Pub. Date: Aug. 16, 2007

(65) Prior Publication Data
US 2009/0005887 A1    Jan. 1, 2009

(30) Foreign Application Priority Data

Feb. 8, 2006   (DE) .......................... 10 2006 005 972

(51) Int. Cl.
*G05B 13/02*   (2006.01)
*G05B 11/28*   (2006.01)
*G05B 5/01*    (2006.01)
*G06F 19/00*   (2011.01)

(52) U.S. Cl. ........... 700/42; 700/204; 318/599; 318/620

(58) Field of Classification Search ............ 700/28, 700/40, 42, 200, 204; 264/40.1, 40.5, 40.7; 318/557, 599, 620; 425/135, 145; 601/84, 601/97, 101, 103, 104
See application file for complete search history.

(56) References Cited

U.S. PATENT DOCUMENTS

| | | | |
|---|---|---|---|
| 4,558,430 A | | 12/1985 | Mogami et al. |
| 5,014,715 A | * | 5/1991 | Chapolini ............. 600/485 |
| 5,428,470 A | * | 6/1995 | Labriola, II ............. 398/109 |
| 5,817,258 A | * | 10/1998 | Ito et al. ............. 264/40.1 |
| 6,242,877 B1 | * | 6/2001 | Irwin et al. ............. 318/557 |
| 6,294,122 B1 | * | 9/2001 | Moss et al. ............. 264/328.9 |
| 6,767,486 B2 | * | 7/2004 | Doughty et al. ......... 264/40.1 |
| 6,769,896 B2 | * | 8/2004 | Kazmer et al. ......... 425/145 |
| 6,824,379 B2 | * | 11/2004 | Doyle et al. ......... 425/564 |
| 7,234,929 B2 | * | 6/2007 | Vasapoli et al. ......... 425/145 |
| 7,725,211 B2 | * | 5/2010 | Ludwig ............. 700/200 |
| 2007/0167888 A1 | * | 7/2007 | Taylor ............. 601/103 |

FOREIGN PATENT DOCUMENTS

EP   0554479   8/1993

OTHER PUBLICATIONS

Article: "Adaptive Control Using Multiple Models", Kumpati, et al, IEEE Transactions on Automatic Control, vol. 42, No. 2, Feb. 1997, pp. 171-187.

(Continued)

*Primary Examiner* — Crystal J Barnes-Bullock
(74) *Attorney, Agent, or Firm* — Holland & Hart, LLP

(57) ABSTRACT

The invention relates to a method for adjusting a system that changes in a cycle to a nonconstant cyclic target profile by comparing measured actual values with appropriate target values for the target profile and outputting a control value.

14 Claims, 2 Drawing Sheets

METHOD FOR ADJUSTING A SYSTEM THAT IS MODIFIED IN A CYCLE TO A NON-CONSTANT CYCLICAL TARGET PROFILE AND CONTROLLER THEREFOR

CROSS-REFERENCE TO RELATED APPLICATIONS

This application is a national phase application, filed pursuant to 35 U.S.C. § 371, of PCT application PCT/DE2007/000154 filed Jan. 25, 2007, which claims priority to DE application 10 2006 005 927.7 filed Feb. 8, 2006, both of which are hereby incorporated by reference in their entirety.

TECHNICAL FIELD

The invention relates to a method for adjusting a system that changes in a cycle to a nonconstant cyclic target profile by comparing measured actual values with appropriate target values for the target profile and outputting a control value. The invention also relates to a controller for a system that changes in a cycle for adjustment to a nonconstant target profile.

In simple forms of application, standard controllers adjust a system to a constant prescribed value. However, ff the prescribed values are meant to change cyclically such that a prescribed profile is followed, the controller accordingly needs to be set to follow. The complexity for this is high, as different curve shapes require different settings. Additionally the computer following the prescribed profile cannot have its control parameters set in optimum fashion if different frequency components arise for the discrepancies between the actual curve and the target profile.

For example, if a target profile is prescribed cyclically at the controller target input, and the system gives a different response over the prescribed cycle for each prescribed point at the respective time of the cycle, a nonlinear system is produced which is no longer able to be implemented using a standard controller (for example a PID controller). This applies particularly if the system to be controlled produces a specific step response for each profile point, such that it has a different characteristic for each point over the course of the profile.

SUMMARY

One embodiment of the present invention is a method that provides control over a nonconstant cyclic target profile using conventional standard controllers. The cyclic target profile is divided into a prescribed number of time periods so that for each time period, a target value for the target profile is prescribed and a current actual value is determined. For each such time period a dedicated controller is used to perform the control separately on the basis of the target value and the actual value.

Another embodiment of the present invention is a controller which includes a multiplicity of digital signal controllers, a control circuit which divides the cycle into sections corresponding to the number of signal controllers and assigns each signal controller a prescribed target value and a measured actual value, and an output arrangement for the controller values generated by the signal controllers.

In a further embodiment, the present invention provides numerous digital signal controllers which are respectively associated with a time period within the cycle and perform conventional control, for example PID control, for this time period. The multiplicity of controllers operating in parallel with one another allows each signal controller to be assigned the parameters of the system which are relevant to it as control parameters. This value is constant because the controller according to the invention approximates the target profile using a multiplicity of profile points, and each profile point represents a constant target value to which constant system conditions apply, so that the parameterization for this profile point has also been fixed so long as the system does not change.

The controller values are preferably output as a control profile at the end of a cycle of target profile and actual profile.

DETAILED DESCRIPTION

Figure 1:
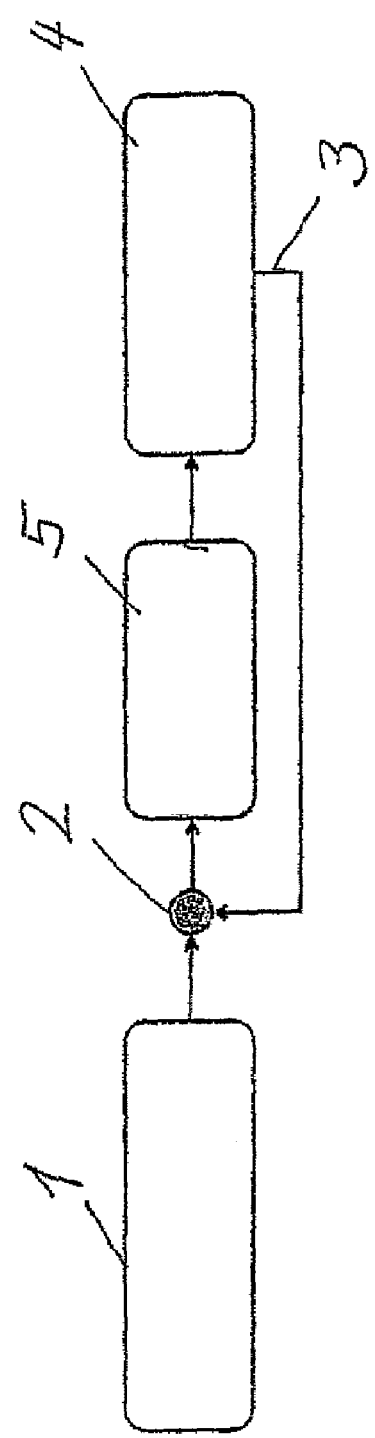
FIG. 1 shows a schematic illustration of a controller arrangement with a nonconstant target profile and a nonlinear controlled system.

The control system shown in FIG. 1 starts from a prescribed target profile 1, which represents in one embodiment the force exerted on an artificial foot during a flexing process. The target profile is compared in a comparator 2 with a response profile 3 from a controlled, nonlinear system 4. The result from the comparator 2 is sent to the controller 5, which is, in one embodiment a PID controller.

The response profile (actual profile) 3 may exhibit heavy distortion in comparison with the target profile 1. Since the conditions for the system 4 are constantly changing over time on account of the prescribed target profile 1, the PID controller 5 is divided into a multiplicity of signal controllers 50, 51, 52 . . . connected in parallel, as shown schematically in FIG. 2.

Figure 2:
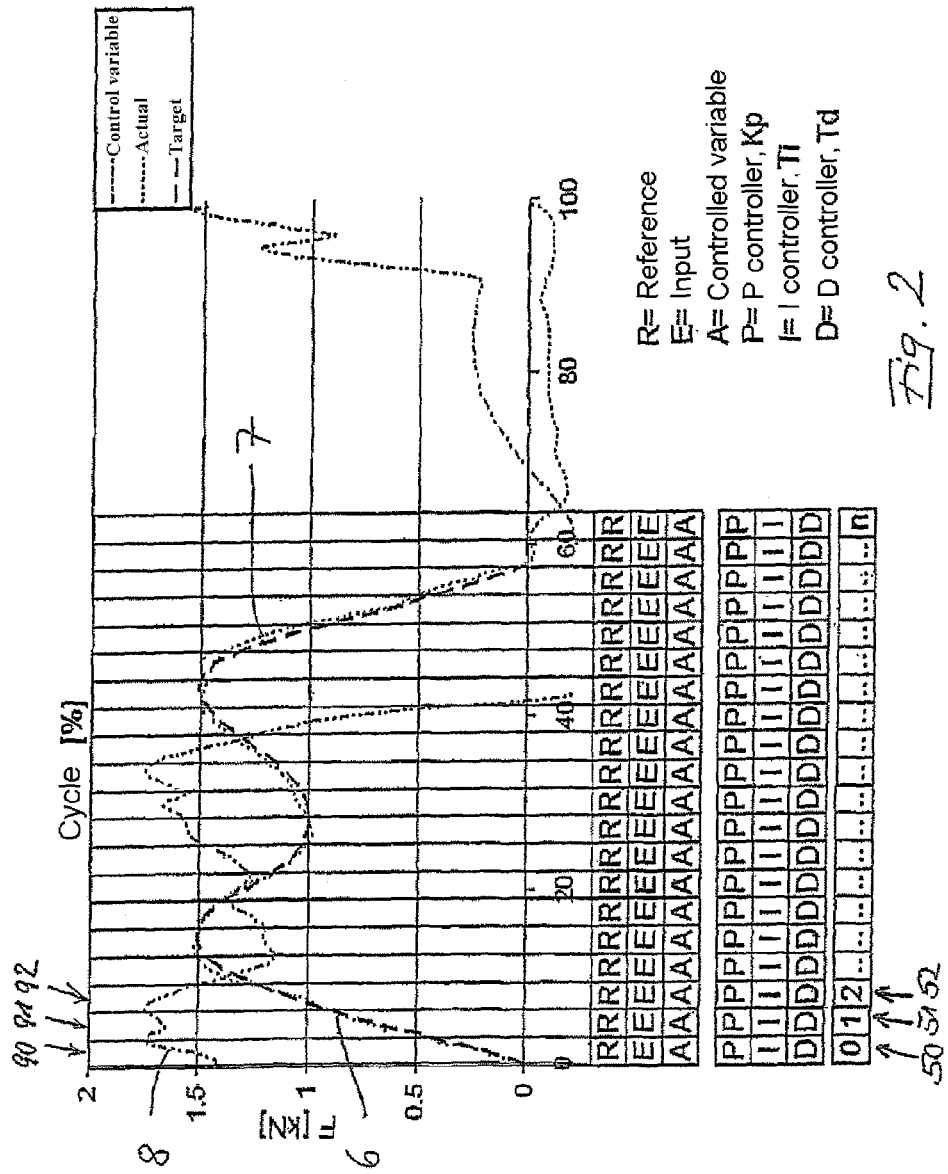
FIG. 2 shows a schematic illustration of the invention with a multiplicity of single controllers which are responsible for a respective time period.

FIG. 2 shows a target curve or profile 6 and an actual curve 7 in a simple form. On the basis of the difference between the respective target value and the respective actual value determined in the comparator 2, the controller 5, for example in the form of a simple proportional controller, generates a controller profile 8 at its output which approximates the actual curve 7 to the target curve 6.

FIG. 2 also shows a cycle along the x-axis for the forces which are produced during the flexing process for an artificial foot when walking. The cycle is split into numerous identical time periods 90, 91, 92, etc., which respectively have an associated PID signal controller 50, 51, 52, etc. From the target profile 6, the signal controllers 50, 51, 52 obtain the target value R (reference) appropriate to the relevant time period 90, 91, 92 and also an actual value E (input), from which a difference value is obtained which can be processed by the signal controller 50, 51, 52 and from which a controller signal A (output) is generated by the signal controller 50, 51, 52.

The signal controllers 50, 51, 52 are set by means of their customary control parameters Kp for the P component, Ti for the I component and Td for the D component such that they match the response of the nonlinear system in the state in the associated time interval 90, 91, 92. FIG. 2 also shows that the cycle is divided into n+1 time intervals 90, 91, 92, etc., and therefore has n+1 single controllers 50, 51, 52, etc.

The controller 5 according to the invention can correct systems which have different step responses at different times within the cycle. To this end, different parameterization (Kp, Ti, Td) can be produced for each curve point. The output values are preferably calculated when a complete cycle has ended.

To produce control for the load placed on an artificial foot during a flexing process, the new output values are calculated and the new output profile is output therefrom. The output profile may differ significantly from the target or actual profile. The fresh load placed on the system by the new output profile produces a new actual profile which is used as an input variable for the controller, while the target profile remains constant.

A prerequisite for the operation of the controller is that the system responds at the point (also at the time) in the profile at which the controller also expects a change. Should phase shifts arise in the system, the phase shift needs to be eliminated. In the aforementioned testing system, this can be achieved by a simple lead in the output profile.

For the greatest possible accuracy, the largest possible number of signal controllers 50, 51, 52 should be provided for dividing the cycle. However, the number actually provided is dependent on the implementation of the controller and the available memory and also on the computation power of the digital circuit.

The invention claimed is:

1. A method for adjusting a system that changes in a cycle to a nonconstant cyclic target profile, comprising:
   comparing measured actual values (E) with appropriate target values (R) for the target profile;
   outputting a control value (A), wherein the target profile is divided into a prescribed number of time periods, prescribing a target value (R) for each time period;
   determining a current actual value (E) for each time period; and
   separately executing a control using a dedicated signal controller for each time period based on the target value (R) and the actual value (E).

2. The method of claim 1, wherein each signal controller includes dedicated parameterization (Kp, Ti, Td) of the control factors (P, I, D).

3. The method of claim 1, including the step of outputting the controller values (A) as a control profile at the end of a cycle.

4. The method of claim 1, wherein the signal controllers are PID controllers.

5. The method of claim 1, wherein the signal controllers are digital signal controllers.

6. The method of claim 1, wherein the executing step is used for controlling the load placed on a prosthesis by a testing machine.

7. The method of claim 1, wherein the executing step is used for controlling the load placed on an artificial foot.

8. A controller for a system that changes, in a cycle, to a nonconstant target profile comprising:
   a plurality of signal controllers;
   a control circuit which divides the cycle into sections corresponding to the number of signal controllers and assigns each single controller a prescribed target value (R) and a measured actual value (E); and
   an output arrangement for the controller values (A) generated by the signal controllers.

9. The controller of claim 8, wherein the output arrangement is configured to output an output profile which is formed from the controller values (A) at the end of a cycle.

10. The controller of claim 8, wherein the signal controllers are individually parameterizable using control parameters (Kp, Ti, Td).

11. The controller of claim 8, wherein the signal controllers are digital controllers.

12. The controller of claim 8, wherein the signal controllers are PID controllers.

13. The controller of claim 8, wherein the output controller values (A) can be supplied to a control device for the placement of a load on a prosthesis by a testing machine.

14. The controller of claim 13, wherein the testing machine is designed for the loads placed on an artificial foot.

* * * * *

UNITED STATES PATENT AND TRADEMARK OFFICE
CERTIFICATE OF CORRECTION

PATENT NO. : 7,937,166 B2
APPLICATION NO. : 12/278930
DATED : May 3, 2011
INVENTOR(S) : Erik Laatsch It is certified that error appears in the above-identified patent and that said Letters Patent is hereby corrected as shown below:

Title page, Item (73) the Assignee "Otto Bock Healthcare IP GmbH & Co. KG" should read --Otto Bock HealthCare GmbH--.

Signed and Sealed this
Twenty-seventh Day of December, 2011

David J. Kappos
*Director of the United States Patent and Trademark Office*